United States Patent
Alexander, Jr.

(10) Patent No.: US 6,922,170 B2
(45) Date of Patent: Jul. 26, 2005

(54) METHODS AND APPARATUS FOR DETERMINING A DIRECTION OF ARRIVAL IN A WIRELESS COMMUNICATION SYSTEM

(75) Inventor: William Francis Alexander, Jr., Monterey, CA (US)

(73) Assignee: Motorola, Inc., Schaumburg, IL (US)

( * ) Notice: Subject to any disclaimer, the term of this patent is extended or adjusted under 35 U.S.C. 154(b) by 669 days.

(21) Appl. No.: 10/056,157

(22) Filed: Jan. 24, 2002

(65) Prior Publication Data

US 2003/0139189 A1 Jul. 24, 2003

(51) Int. Cl.[7] ............................................. G01S 5/04
(52) U.S. Cl. .................................. 342/443; 342/423
(58) Field of Search ............................. 342/423, 437, 342/442, 443, 445

(56) References Cited

U.S. PATENT DOCUMENTS

| | | | | | |
|---|---|---|---|---|---|
| 5,774,087 | A | * | 6/1998 | Rose ........................... | 342/13 |
| 6,567,034 | B1 | * | 5/2003 | Yu .............................. | 342/16 |
| 6,600,447 | B1 | * | 7/2003 | Molnar ....................... | 342/378 |
| 6,731,954 | B1 | * | 5/2004 | Katz .......................... | 455/562.1 |
| 6,795,424 | B1 | * | 9/2004 | Kapoor et al. .............. | 370/343 |
| 2002/0072336 | A1 | * | 6/2002 | Mottier ....................... | 455/101 |

OTHER PUBLICATIONS

An article entitled "V–Blast: An Architecture for Realizing Very High Data Rates Over the Rich–Scattering Wireless Channel" by P.W. Wolniansky, G.J. Foschini, G.D. Golden, R.A. Valenzuela; Bell Laboratories, Lucent Technologies, Crawford Hill Laboratory, 791 Holmdel–Keyport Rd., Holmdel, NJ 07733.

An article entitled Detection algorithm and initial laboratory results using V–BLAST space–time communication architecture , by G.D. Golden, C.J. Foschini, R.A. Valenzuela and P.W. Wolniansky from Electronics Letters, 7th Jan. 1999 vol. 35 No. 1.

An article entitled "The Most Efficient Implementation of the IQML Algorithm" by Yingbo Hua, from 1994 IEEE Transactions on signal processing.

An article entitled Comparative Study of IQML and MODE Direction–of–Arrival Estimators by Jian Li, Senior Member, IEEE Petre Stoica, Fellow, IEEE and Zheng–She Liu from IEEE Transactions on signal processing Jan., 1998.

*An article entitled "Two Decades of Array Signal Processing Research"/The Parametric Approach by Hamid Krim and Mats Viberg from IEEE Signal Processing Magazine, Jul. 1996.*

* cited by examiner

*Primary Examiner*—Dao L. Phan
(74) *Attorney, Agent, or Firm*—Ingrassia Fisher & Lorenz, P.C.

(57) ABSTRACT

Methods and apparatus are provided for determining a direction of arrival (DOA) (46) of a Radio Frequency (RF) signal (32) transmitted by a remote unit (22) in a wireless communication system (20). The methods comprise receiving the RF signal (32) with multiple antennas (34,36,38,40, 42,44) of the antenna array (26) and determining a preliminary direction of arrival (DOA) (78) for the RF signal (32) received with the multiple of antennas (34,36,38,40,42,44) of the antenna array (26). The methods also comprise selecting a coefficient (80) for the antenna array (26) based at least in part upon the preliminary DOA 978), modifying the RF signal (32) with the coefficient (80) to generate a modified RF signal (82), and determining the DOA (46) of the RF signal (32) with the modified RF signal (82).

26 Claims, 4 Drawing Sheets

METHODS AND APPARATUS FOR DETERMINING A DIRECTION OF ARRIVAL IN A WIRELESS COMMUNICATION SYSTEM

FIELD OF THE INVENTION

The present invention generally relates to wireless communication systems, and more particularly to methods and apparatus for determining a direction of arrival (DOA) of a signal transmitted by a remote unit in a wireless communication system.

BACKGROUND OF THE INVENTION

There are numerous applications that can use the location of a remote unit in a wireless communication system. For example, the location of the remote unit can be used for emergency services, so that police, fire and/or medical services can be dispatched to the location of the subscriber requesting such an emergency service. In addition, the location of the remote unit can be used in detecting fraudulent use of the communication system, police investigations, and the like. Furthermore, the location of a remote unit can be used to improve performance of the wireless communication system. For example, wireless communication systems that utilize beam-forming transceivers can tune the beams based at least in part on the direction of arrival (DOA) of a signal transmitted from the remote unit. DOA is often an important parameter used in location determination.

Wireless communication systems currently have the capability for determining the location of a remote unit. However, increased resolution for the DOA of a signal from the remote unit is continually sought for these communication systems. (See H. Krim and M. Viberg, "Two Decades of Signal Processing Research," IEEE Signal Processing Magazine, Vol. 13, No. 4, Jul. 1996 (hereinafter referred to as the "Two Decades Reference"), which is hereby incorporated by reference.) In order to improve the resolution for the DOA of a signal from a remote unit in a wireless communication system that utilizes an array of antennas (i.e., antenna array), the methods and apparatus for determining the DOA preferably address array distortions.

Array distortions, which collectively refers to a wide variety of distortions and modeling errors, can be attributed to any number of factors, including physical manufacturing differences between antenna arrays, mutual coupling between elements of antenna arrays, mutual coupling between elements of arrays and metallic resonators, differences in the connection lengths between array elements, characteristic differences of transceivers that are processing signals received from the elements of antenna arrays, and so forth. These array distortions are known to be sources of degradation to DOA estimation accuracy, and methods and apparatus have been proposed to compensate for array distortions.

For example, direction-finding (DF) techniques have been developed that determine DOAs of multiple simultaneously detected co-channel signal sources, including the Multiple SIgnal Classification (MUSIC) and the Estimation of Signal Parameters via Rotational Invariance Techniques (ESPRIT). (See R. O. Schmidt, "Multiple Emitter Location and Signal Parameter Estimation," IEEE Transactions on Antennas and Propagation, Vol. AP-34, No. 3, March 1986, pp. 276–280, which is hereby incorporated by reference, and U.S. Pat. No. 4,750,147 titled "Method for Estimating Signal Source Locations and Signal Parameters using an Array of Signal Sensor Pairs," issued to Richard H. Roy, III et al. on Jun. 7, 1988, which is hereby incorporated by reference.) MUSIC utilizes pre-recorded measurements of the array manifold, so this technique is largely immune to array distortion effects. However, MUSIC is an unstructured method and therefore computationally intensive as each DOA estimate requires a full scan of the entire array manifold. ESPRIT is less computationally intensive as compared to MUSIC as it does not utilize a-priori measurements of the array manifold. However, ESPRIT generally requires identical pairs of sensors, which makes it susceptible to many mechanisms that induce array manifold errors.

Calibration of the array manifold, which is commonly used to specify the response of the antenna array to a stimulus and an idealized response and a composite of the idealized response with the effect of array distortions, continues to be a subject that is investigated for increasing the accuracy of DOA estimates. For example, investigations have been conducted to identify the array manifold distortions that are present in complex environments. (See A. Leshem and M. Wax, "Array Calibration in the Presence of Multipath," IEEE Transactions on Signal Processing, Vol. 48, No. 1, January 2000, pp. 53–59(hereafter referred to as the "Leshem Reference"), which is hereby incorporated by reference.) These investigations have shown that calibration for array manifold distortions in complex environments does provide the desired increases in the accuracy of DOA estimation.

In view of the foregoing, is should be appreciated that it would be desirable to provide methods and apparatus for determining a direction of arrival (DOA) of a signal. It should also be appreciated that it is desirable to provide such methods that are resistant to array manifold distortions and that are computationally efficient. Furthermore, additional desirable features will become apparent to one skilled in the art from the drawings, foregoing background of the invention and following detailed description of a preferred exemplary embodiment, and appended claims.

BRIEF DESCRIPTION OF THE DRAWINGS

The present invention will hereinafter be described in conjunction with the following drawing figures, wherein like numerals denote like elements, and.

DETAILED DESCRIPTION OF A PREFERRED EXEMPLARY EMBODIMENT

The following detailed description of a preferred embodiment is merely exemplary in nature and is not intended to limit the invention or the application and uses of the invention.

Figure 1:
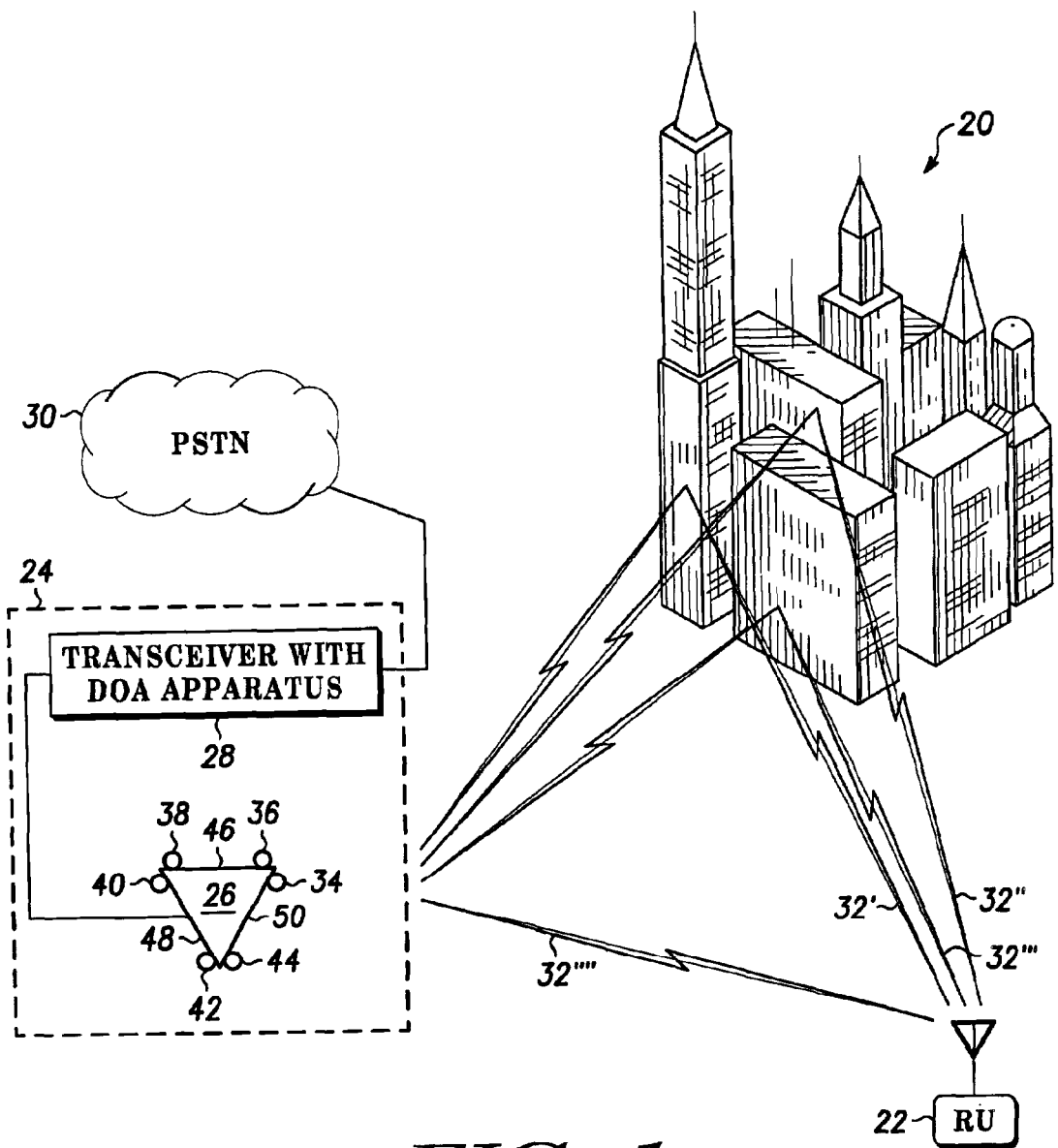
FIG. 1 is a wireless communication system according to a preferred exemplary embodiment of the present invention.

FIG. 1 is a block diagram of a wireless communication system 20 that includes an apparatus for determining the direction of arrival (DOA) of a remote unit (RU) 22 according to a preferred exemplary embodiment of the present invention. The wireless communication system 20 described in this detailed description of a preferred exemplary embodiment is directed to a cellular or personal communication system (PCS). However, the principles discussed herein can be readily applied to other wireless based, radio, cable television (CATV), telephony or satellite telecommunication systems as well as other data communications systems. Furthermore, while the wireless communication system 20 of the preferred exemplary embodiment of the present invention is configured to utilize a Code Division Multiple Access (CDMA) protocol as described in TLA/EIA Interim Standard IS-95A, Mobile Station-Base Station Compatibility Standards for Dual-Mode Wideband Spread Spectrum Cellular Systems, Telecommunications Industry Association, Washington, D.C. July 1993 (hereinafter referred to as the "IS-95A Reference Document"), which is hereby incorporated by reference, the wireless communication system 20 may utilize other system protocols such as, but not limited to the Narrowband Advanced Mobile Phone Service (NAMPS) protocol, the Advanced Mobile Phone Service (AMPS) protocol, the Personal Digital Cellular (PDC) protocol, the Global System for Mobile Communications (GSM) protocol, Two-Way Paging protocols, or the United States Digital Cellular (USDC) protocol and future generations thereof.

In addition to the remote unit 22, the wireless communication system 20 includes, but is not limited to, a sectorized base site 24 having an antenna array 26 and transceiver with DOA apparatus 28 in operative communication with another communication system, such as a public switched telephone network (PSTN) 30. The remote unit 22 transmits a radio frequency (RF) signal 32 that is received by multiple antennas (34,36,38,40,42,44) forming the antenna array 26. The antenna array 26 can have any number of antennas and any number of antenna array configurations and antenna types can be utilized in accordance with the present invention. The RF signal 32 received by the antenna array 26 is provided to the transceiver with DOA apparatus 28, which preferably demodulates and decodes the RF signal 32 and identifies a DOA and/or DOA estimate of the RF signal 32 transmitted by the remote unit 22.

Figure 2:
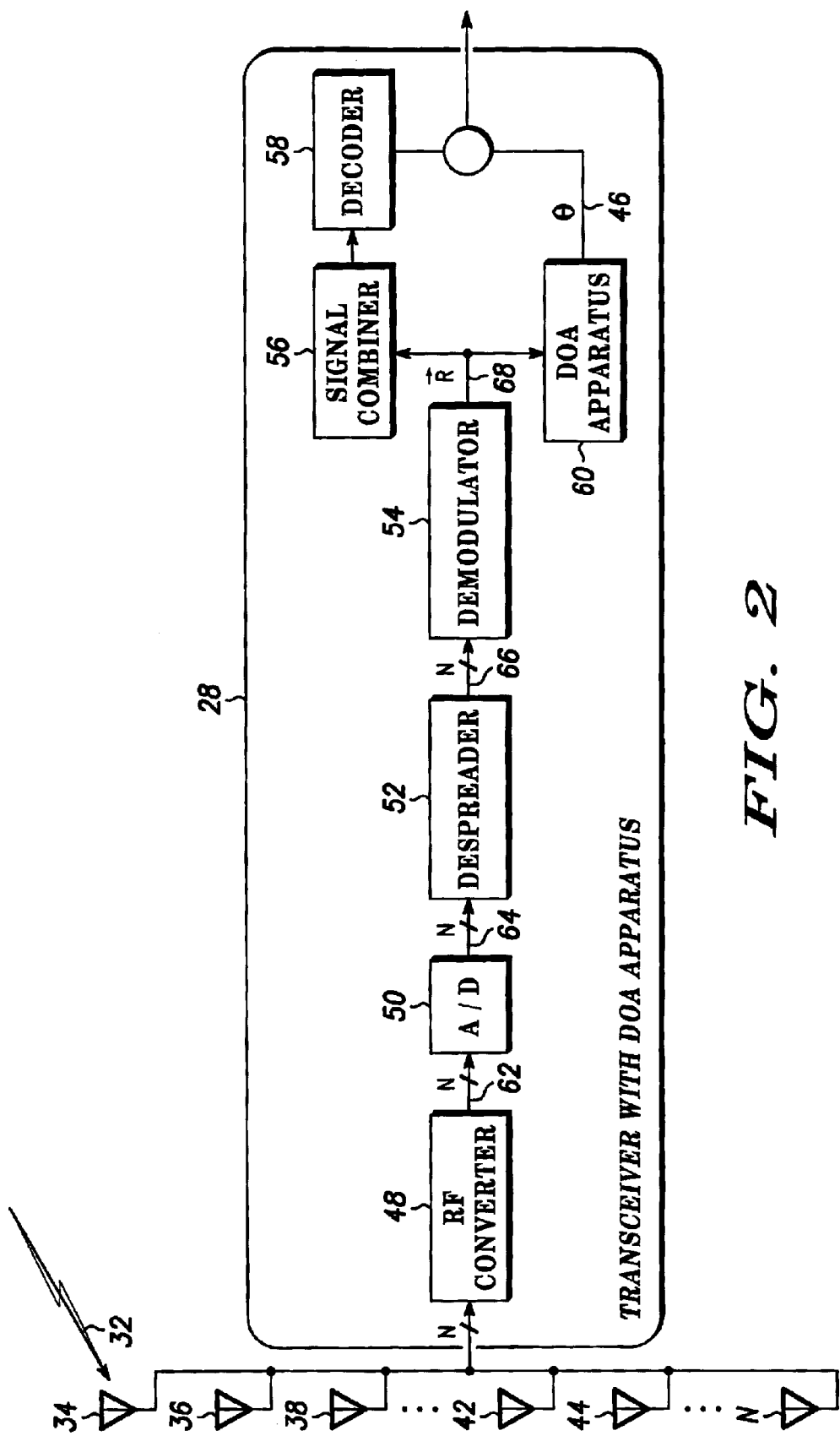
FIG. 2 is the transceiver with direction of arrival (DOA) apparatus of FIG. 1 in greater detail according to a preferred exemplary embodiment of the present invention.

Referring to FIG. 2, the transceiver with DOA apparatus 28 is shown in greater detail, which is configured to decode and demodulate the RF signal 32 and identify a DOA estimate (θ) 46 of the remote unit. The transceiver with DOA apparatus 28 includes, but is not limited to, a RF converter 48, analog-to-digital (A/D) converter 50, despreader 52, demodulator 54, signal combiner 56, decoder 58 and DOA apparatus 60. While the following detailed description of a preferred exemplary embodiment is directed to a transceiver with DOA apparatus 28, it should be understood that the DOA apparatus 60 can be a separate component of the sectorized base site or located outside of the sectorized base site, including with the remote unit.

The RF signal 32 transmitted by the remote unit is received by the antennas (34,36,38,40,42,44). The antennas (34,36,38,40,42,44) are configured to intercept electromagnetic radiation of the RF signal 32 within a selected frequency band. The antennas (34,36,38,40,42,44) can be any number of electromagnetic interception devices, including, but not limited to a wave guide, a coaxial cable, an optical fiber or an infrared frequency transducer. The electromagnetic radiation of the RF signal 32 that is intercepted by the antennas (34,36,38,40,42,44) is converted to analog signals 62 with the RF converter 48. The analog signals 62 are digitized with the A/D converter 50 to produce digitized signals 64 representing the electromagnetic radiation intercepted by the antennas (34,36,38,40,42,44) within the intercepted frequency band.

The RF signal 32 received by the antennas (34,36,38,40, 42,44), converted by the RF converter 48 and digitized with the A/D converter 50 includes multiple scattered rays produced by multi-path scattering of the RF signal 32 during transmission from the remote unit, with each ray of the multiple scattered rays a separate multi-path reflection of the RF signal 32. The multiple scattered rays produced by the multi-path scattering are generally arriving from different directions, at different time delays, and generally have different complex valued amplitudes (i.e., different magnitude and phase components). Therefore, the RF signal 32 received from the remote unit includes multiple scattered rays having different complex amplitudes, times of arrival, and DOAs.

The collection of voltages produced by each scattered ray ($r_i$) at a given time (t) on the antenna array elements can be expressed, in the absence of noise, as:

$$r_i(t) = c(\theta_i)s(t-\tau_i) \quad (1)$$

Where $\tau_i$ is the time delay of ray i, $\theta_i$ is the DOA of ray i, s(t) is the transmitted signal and $c(\theta_i)$ is the composite array manifold resulting from a stimulus having the DOA $\theta_i$. A model for the vector-valued received signal r(t) with multi-path scattering incorporating N rays can be expressed as:

$$r(t) = r_1(t) + r_2(t) + \ldots + r_N(t) \quad (2)$$

In a preferred exemplary embodiment of the present invention, the RF signal 32 with the multi-path scattering incorporating N rays is an encoded spread-spectrum digital signal having a multiplicity of frequency and time overlapping coded signals from multiple remote units within the wireless communication system. The multiplicity of frequency and time overlapping coded signals are typically transmitted simultaneously at the same or substantially similar radio frequency and are distinguishable through specific modulation and spreading. In other words, the RF signal 32 received by the antennas (34,36,38,40,42,44) is preferably a composite signal of individual signals transmitted within the wireless communication system, and the RF signal of a single remote unit is generally distinguishable only after despreading and demodulation. Therefore, the digitized signals 64 are presented to the despreader 52 and the demodulator 54. More specifically, the digitized signals 64 are provided to the despreader 52 for despreading and generation of despread signals 66. The despread signals 66, representing the transmission from a single remote unit, are subsequently demodulated with the demodulator 54 and demodulated signals 68 are produced having in-phase (I) and quadrature phase (Q) components.

As previously discussed in this detailed description of a preferred exemplary embodiment, the RF signal 32 received from the remote unit generally includes multiple scattered rays having different amplitudes, DOAs and time delays, therefore the in-phase (I) and quadrature phase (Q) components of the demodulated signals 68 have also undergone multiple reflections that result in echoes of the in-phase (I) and quadrature phase (Q) components. In the preferred exemplary embodiment, the despreading and demodulation functions of the despreader 52 and demodulator 54, respectively, isolate the plurality of time-delayed rays received by the antennas (34,36,38,40,42,44). The demodulated signals 68 can be represented by a matrix-valued signal (R) that contains representations of the scattered plurality of rays of the demodulated signals 68 and can be expressed as:

$$R=[c(\theta_1)h(\tau_1)c(\theta_2)h(\tau_2)c(\theta_3)h(\tau_3)]+N=[r_1 r_2 r_3] \quad (3)$$

Where N is associated with sources of thermal noise and other noise components of the RF signal. The first column ($r_1$) of the matrix-valued signal (R) representation of the demodulated signals 68 represents the plurality of prompt rays (i.e., rays arriving at the earliest time delay ($\tau_1$)) received by the antennas (34,36,38,40,42,44) and can be expressed as:

$$r_1=[r_{11} r_{12} r_{13} r_{14} r_{15} r_{16} \ldots r_{1M}]^T \quad (4)$$

Where M represents the number of antennas in the antenna array. The subsequent columns ($r_2, r_3, r_4 \ldots$) of the matrix-valued signal (R) representation of the demodulated signals 68 represent the subsequent time-delayed echoed rays received by the antennas (34,36,38,40,42,44) and can be expressed as:

$$r_2=[r_{21} r_{22} r_{23} r_{24} r_{25} r_{26} \ldots r_M]^T \quad (5)$$

$$r_3=[r_{31} r_{32} r_{33} r_{34} r_{35} r_{36} \ldots r_M]^T \quad (6)$$

$$r_4=[r_{41} r_{42} r_{43} r_{44} r_{45} r_{46} \ldots r_M]^T \quad (7)$$

The scaling values ($h(\tau_i)$) represent a factor due to the time delay of the echoes that is common across substantially all antenna elements. The demodulated signals 68 are preferably provided to the signal combiner 56, decoder 58 and DOA apparatus 60 for subsequent processing.

In a preferred exemplary embodiment of the present invention, the signal combiner 56 and decoder 58 are configured to perform CDMA combining and decoding of in-phase (I) and quadrature phase (Q) components of each remote unit as described in the IS-95A Reference Document. For example, the signal combiner 56 is configured to receive the in-phase (I) and quadrature phase (Q) components of prompt rays and the plurality of echo rays and combine the scattered plurality of rays to form one coherent in-phase (I) and quadrature (Q) signal for each remote unit. This coherent in-phase (I) and quadrature (Q) signal generated from the echo rays and scattered plurality of rays is organized into groups of sampled and predetermined length signals (e.g., groups with a sample length of sixty-four) that are independently provided to the decoder 58, which is most preferably an orthogonal decoder, for subsequent decoding. In addition to generating the coherent in-phase (I) and quadrature (Q) signal from the scattered plurality of rays for decoding with the decoder 58, the DOA apparatus 60 can be configured to generate the DOA estimate ($\theta$) 46 from the demodulated signals 68. However, it should be understood that the DOA apparatus 60 can be configured to generate the DOA estimate ($\theta$) 46 from the RF signal 32 received by the multiple antennas of the antenna array in any number of signal forms and formats, including modulated and analog signals.

Figure 3:
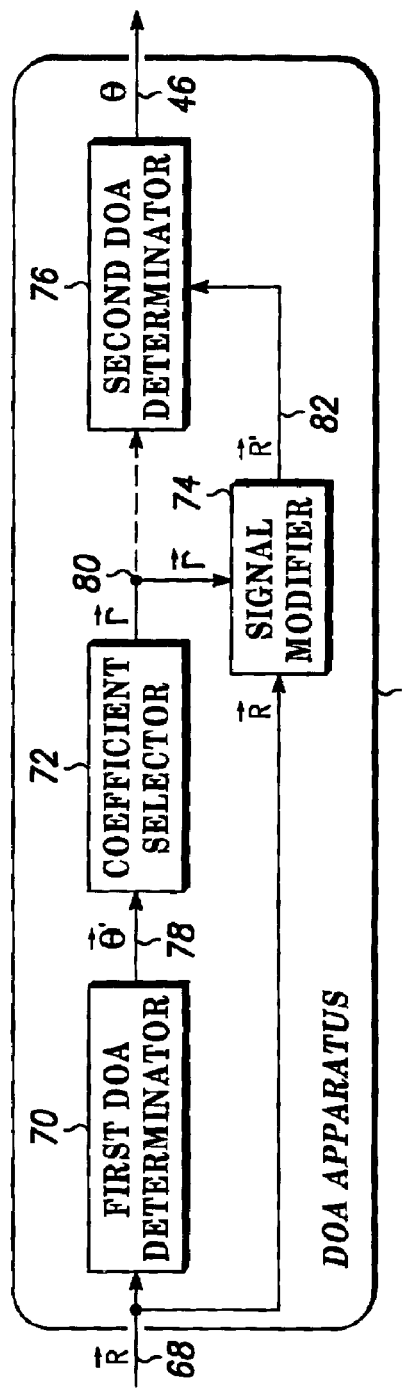
FIG. 3 is the DOA apparatus of FIG. 2 in greater detail according to a preferred exemplary embodiment of the present invention.

Referring to FIG. 3, the DOA apparatus 60 is shown in greater detail, which is configured to determine the DOA estimate ($\theta$) 46 of the RF signal transmitted by the remote unit in the wireless communication system. The DOA apparatus 60 includes, but is not limited to a first DOA determinator 70, coefficient selector 72, signal modifier 74 and second DOA determinator 76. Generally, the first DOA determinator 70 is configured to determine at least one preliminary DOA ($\theta'$) 78 for the RF signal received with the multiple antennas of the antenna array and more preferably determines more than one preliminary DOA ($\theta'$) 78 for the RF signal received at the multiple antennas of the antenna array. The preliminary DOA ($\theta'$) 78 or preliminary DOAs ($\theta'$) 78 are provided to the coefficient selector 72 that selects at least one coefficient ($\Gamma$) 80 and preferably selects more than one coefficient ($\Gamma$) 80, which are preferably array distortion or coupling coefficients, based at least in part upon the preliminary DOA ($\theta'$) 78 or preliminary DOAs ($\theta'$) 78. The signal modifier 74 receives the RF signal and the coefficient ($\Gamma$) 80 or coefficients ($\Gamma$) 80 and modifies the RF signal to produce a modified RF signal 82, which is provided to the second DOA determinator 76 for determination of the DOA estimate ($\theta$) 46.

More particularly, and with continued reference to FIG. 3, the DOA apparatus 60 receives the demodulated signals 68 of the RF signal received at the antennas of the antenna array. However, the DOA apparatus can be configured to receive the RF signal received at the antennas of the antenna array in any number of signal formats, forms or representations. The first DOA determinator 70 is preferably configured to determine preliminary DOAs ($\theta'=[\theta_1' \theta_2' \ldots \theta_M']$, where M is the number of antennas of the antenna array) 78 for the RF signal received at the antenna of the antenna array. The first DOA determinator 70 can be configured to determine the preliminary DOAs ($\theta'$) 78 with any number of techniques, including, but not limited to, the methods and apparatus described in U.S. Pat. No. 5,786,791, titled "Method for Determining an Angle of Arrival of a Signal Transmitted by a Remote Unit in a Communication System," issued to Eugene J. Bruckert on Jul. 28, 1998 (hereinafter referred to as the "Bruckert Reference"), which is hereby incorporated by reference, the methods and apparatus described in the U.S. patent application titled "Methods and Apparatus for Determining a Direction of Arrival in a Wireless Communication System," naming William F. Alexander, Jr. as the sole inventor and having an attorney docket number of CE04453N (hereinafter referred to as the "Alexander Reference"), which is hereby incorporated by reference, and any of the methods and apparatus presented in the Two Decades Reference. The preliminary DOAs (θ') 78 are provided to the coefficient selector 72 that is configured to select the coefficient or coefficients, which are preferably array distortion coefficients (Γ) 80, but can be any number of coefficients. As previously described in this detailed description of a preferred exemplary embodiment, the coefficient selector 72 selects the array distortion coefficients (Γ) 80 based at least in part upon the preliminary DOAs (θ') 78 received from the first DOA estimator 70.

While any number of relationships can be utilized to select the array distortion coefficients (Γ) 80, the array distortion coefficients (Γ) 80 are preferably selected using the relationship between the composite array manifold (c(θ)), ideal array manifold (b(θ)) and a pre-multiplying linear distortion term (Γ(θ)), which can be expressed as:

$$c(\theta) = \Gamma(\theta)b(\theta) \quad (8)$$

The pre-multiplying linear distortion term (Γ(θ)) incorporates the collective effect of the array distortions and is angularly dependent. While the effects of array distortion depend on the DOA of the RF signal, the array distortions are relatively consistent over a range of DOA values (i.e., for small angular ranges relative to a full three hundred and sixty degrees (360°) DOA range, the array distortions are substantially similar). This can be mathematically expressed as follows for a value (x) within a region at or near zero degrees (0°):

$$\Gamma(\theta) \approx \Gamma(\theta + x) \quad (9)$$

Figure 4:
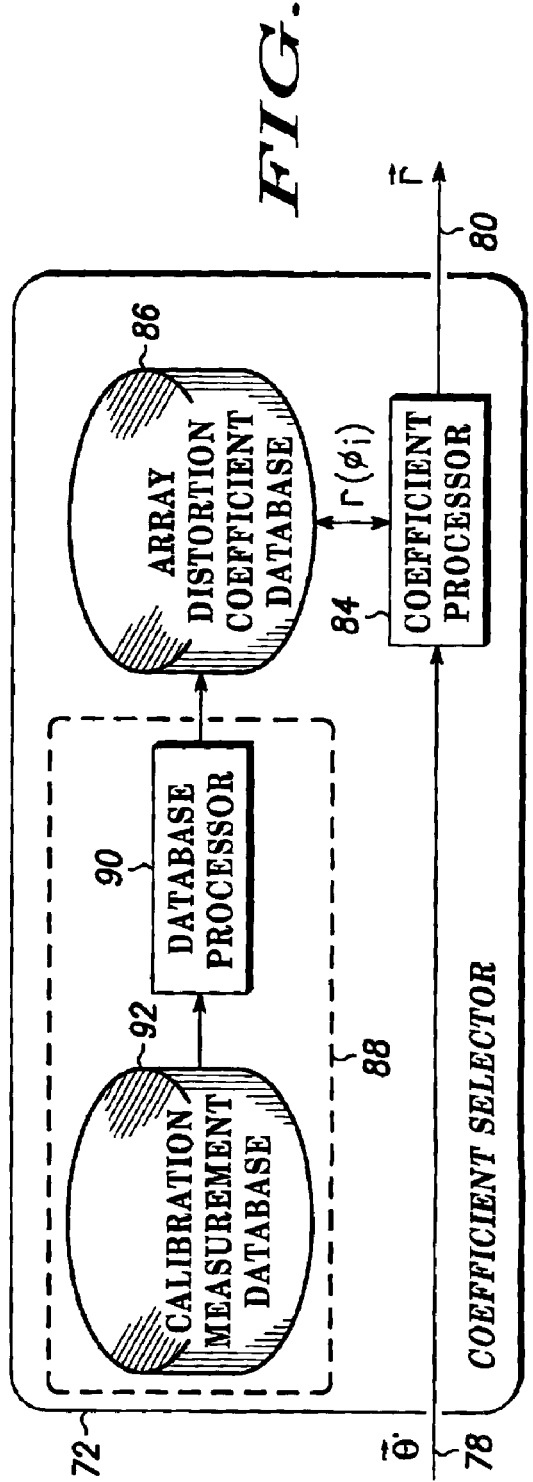
FIG. 4 is the coefficient selector of FIG. 3 in greater detail according to a preferred exemplary embodiment of the present invention.

Referring to FIG. 4, the coefficient selector 72 is shown in greater detail, which is configured to select the array distortion coefficients (Γ) 80 using the foregoing relationships expressed in equations (8) and (9). In this detailed description of a preferred exemplary embodiment, the coefficient processor 84 of the coefficient selector 72 initially identifies a target DOA ($\phi_i$) for each of the preliminary DOAs (θ') 78. For example, the coefficient processor 84 identifies a target DOA ($\phi_i$) that has a value that is the most similar to the preliminary DOA (θ$_i$'). Once the target DOA ($\phi_i$) is identified by the coefficient processor 84, array distortion coefficients (Γ($\phi_i$)) are selected from the array distortion coefficient database 86 that correspond to the identified target DOA ($\phi_i$).

The array distortion coefficient database 86 can be generated prior to operation of the wireless communication system, upon activation of the wireless communication system and during operation of the wireless communication system. In addition, the array distortion coefficient database 86 can be generated using any number of techniques. For example, according to a preferred exemplary embodiment of the present invention, the array distortion coefficient database 86 is generated by the database generator 88, which includes, but is not limited to a database processor 90 and a calibration measurement database 92 that contains calibration measurements of the antenna array (e.g. array distortion measurements), which can be determined by a variety of methods, including, but not limited to the in-situ method as described in the Leshem Reference, anechoic chamber or antenna range calibration measurements, numerical computation by finite element analysis, and numerical computation by method-of-moments analysis. The database processor 90 retrieves the calibration measurements from the calibration measurement database 92 and preferably conducts any number of reduction processes for generation of the array distortion coefficient database 86.

Figure 5:
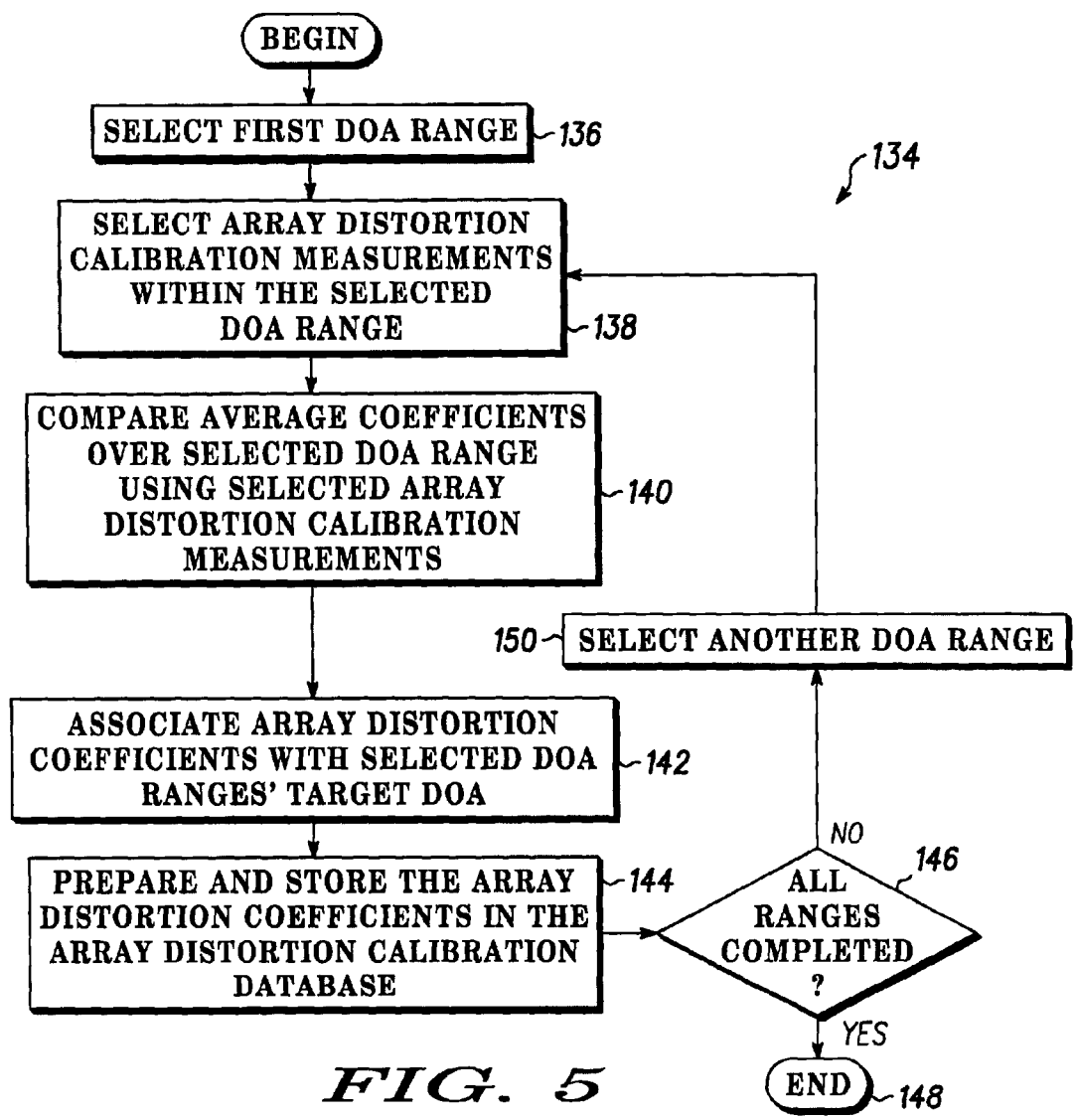
FIG. 5 is a flowchart of a reduction method performed by the coefficient processor of FIG. 4 according to a preferred exemplary embodiment of the present invention.
Figure 6:
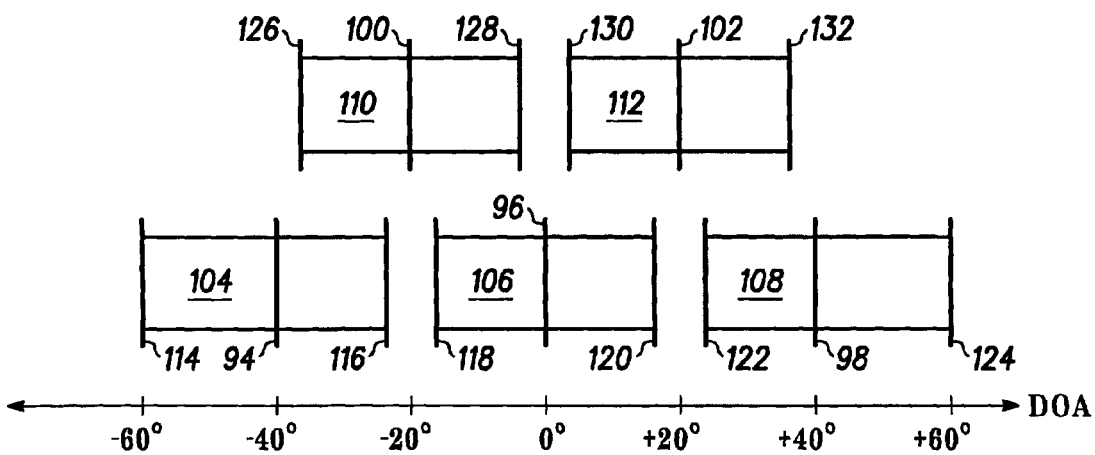
FIG. 6 is an illustrative example of DOA ranges, range boundaries and DOA targets for which the coefficient processor of FIG. 4 performs the reduction method of FIG. 5.

For example, and with reference to FIGS. 5 and 6, a reduction method 134 is illustrated in FIG. 5 according to a preferred exemplary embodiment of the present invention for an illustrative collection of DOA targets (94,96,98,100, 102), a corresponding collection of DOA ranges (104,106, 108,110,112) and corresponding DOA range boundaries (114,116,118,120,122,124,126,128,130,132) shown in FIG. 6. The selection of DOA ranges, DOA range targets, and DOA range boundaries can be determined by any number of methods including, but not limited to correlation analysis. Furthermore, it should be understood that the DOA targets (94,96,98,100,102), corresponding collection of DOA ranges (104,106,108,110,112) and corresponding DOA range boundaries (114,116,118,120,122,124,126,128,130, 132) shown in FIG. 6 are only illustrative examples and any target, range and boundary value is within the scope of the present invention.

The reduction method 134 initially selects a first DOA range (e.g., a first range 104 of FIG. 6) 136. Once the first DOA range is selected 136, the array distortion calibration measurements are identified that are within the DOA range 138. The selected array distortion calibration measurements identified within the DOA range are linearly averaged 140, yielding array distortion coefficients. These array distortion coefficients are associated with the target DOA for the selected DOA range (e.g. target DOA 94 for the first DOA range 104 of FIG. 6) and stored in the array distortion coefficient database 144. Subsequently, a query is conducted to ascertain whether each of the DOA ranges have been processed during the current execution cycle 146 of the reduction method 134. If each of the DOA ranges has been processed during the current execution cycle 146 of the reduction method 134, the generation of the array distortion coefficient database is complete and the method ends 148. If there are remaining DOA ranges (e.g., ranges 106,106,110 and 112 of FIG. 6) to process, the reduction method 134 selects another DOA range (e.g., the second range 106 of FIG. 6) 150 and continues with the selection of the array distortion calibration measurements within the selected DOA range 138 as previously described until the condition is met that each of the ranges has been processed 146 by the reduction method 134. Once the condition is met that each of the ranges has been processed 146 by the reduction method 134, the component array distortion coefficients are available from the array coefficient database.

Referring to FIG. 4, the distortion coefficients (Γ($\phi_i$)) associated with the target DOAs that correspond to the preliminary DOAs (θ') 78 are preferably collected by coefficient processor 84 to form the array distortion coefficients (Γ) 80. The collection by the coefficient processor 84 can utilize any number of techniques. For example, the array distortion coefficients corresponding to the preliminary DOAs (θ') 78 are retrieved from the array distortion coefficient database 86 and concatenated to form the array distortion coefficients (Γ) 80 as follows:

$$\Gamma = [\Gamma(\phi_1)\Gamma(\phi_2) \ldots \Gamma(\phi_N)] \quad (10)$$

Referring to FIG. 3, this collection of array distortion coefficients (Γ) 80 is provided by the coefficient selector 72 to the signal modifier 74.

As previously discussed in this detailed description of a preferred exemplary embodiment, the signal modifier 74 uses the array distortion coefficients (Γ) 80 to produce the modified RF signal 82 that is used by the second DOA determinator 76 to determine the estimated DOA 46. More particularly, the signal modifier 74 preferably receives distortion coefficients 80 (Γ) and demodulated signals 68 of the RF signal. The demodulated signals 68 represented by the matrix valued signals (R) as discussed with reference to equations (3) through (7) are modified with the associated array distortion coefficients (Γ($\phi_i$)) for each scattered ray ($r_i$) to provide array distortion compensation and produce each modified scattered ray ($r_1'$) of the modified RF signal 82 represented by the matrix-valued modified signal (R') as follows:

$$r_i' = \Gamma^{-1}(\phi_i) r_i = b(\theta_i) h(\tau_i) + \Gamma^{-1}(\phi_i) n_i \tag{11}$$

Where $n_i$ is a noise term associated with the sources of thermal noise and other noise components of the RF signal. While the modification of the RF signal according to the relationship expressed in equation (11) employs direct matrix inversion to remove the effect of array distortions, a variety of additional array distortion compensation methods can be used to remove or compensate for the array distortions, including, but not limited to least squared error methods, total least squares methods, structured least squares methods and maximum likelihood methods, for example. (See P. Stoica, R. Moses, "Introduction to Spectral Analysis," Prentice Hall, New Jersey, 1997, which is hereby incorporated by reference, and S. Haykin, "Adaptive Filter Theory," second edition, Prentice Hall, New Jersey, 1991, which is hereby incorporated by reference.) In a preferred embodiment of the present invention, signal modifier 74 is configured to employ one of the array distortion compensation methods to each of the columns ($r_i$) of matrix valued signals (R) using the array distortion coefficients Γ($\phi_i$) corresponding to the columns ($r_i$) as selected by the coefficient selector 72 to produce the modified RF signal 82.

The second DOA estimator 74 receives the modified RF signal 82 and determines the DOA estimate (θ) 46 using any number of techniques, including, but not limited to, any of the methods applicable to the first DOA determinator 70. Determination of the DOA estimate 46 by the second DOA estimator 76 with the modified RF signal 82 yields the DOA estimate (θ) 46 that has reduced degradation due to the effects of array distortion as these effects have been mitigated by the operation of the signal modifier 74 on the RF signal. While a first DOA determinator 70 and second DOA determinator 76 are presented in this detailed description of a preferred exemplary embodiment, a single DOA determinator can be configured to perform the operations of the first DOA determinator 70 and second DOA determinator 76 in accordance with the present invention. In addition, the second DOA estimator can be configured to receive the array distortion coefficients 80 (Γ) according to a second preferred exemplary embodiment of the present invention.

According to the second preferred embodiment of the present invention, the second DOA determinator 76 is configured to receive the array distortion coefficients (Γ)80 and use additional DOA estimation methods for further improvement in the accuracy of the DOA estimate (θ) 46. For example, the DOA estimation methods of the Two Decades Reference can utilized to derive the deterministic or stochastic maximum likelihood cost functions. These cost functions presented in the Two Decades Reference are modified to configure the signal modifier 74 to alter the noise covariance matrix and possibly the form of the orthogonal projection matrix. Alternatively, the signal modifier 74 can be configured to employ direct matrix inversion and such a configuration would preferably include modification that is limited to the noise covariance of the cost functions presented in the Two Decades Reference. Once this modification to the cost functions is completed, any number of methods can be used to determine the DOA estimate from the modified RF signal 82, including, but not limited to Iterative Quadratic Maximum Likelihood (IQML), MODE, and Weighted Subspace Fitting (WSF) techniques presented in the Two Decades Reference. For example, the signal modifier 74 is configured to employ direct matrix inversion, and the second DOA determinator is configured to employ a modified IQML or WSF method. The orthogonal projector for the white noise case can be expressed as follows:

$$\Pi^{195}{}_A^\perp = B(B^H B)^{-1} B^H \tag{12}$$

Where $\Pi^{195}{}_A^\perp$ is a projection orthogonal to the idealized array manifold, and B is a Toeplitz matrix constructed so as to yield the orthogonal projection (For additional information regarding construction of the Toeplitz matrix (B), see Y. Bresler, A. Macovski, "Exact Maximum Likelihood Parameter Estimation of Superimposed Exponential Signals in Noise," IEEE Transactions on Acoustics, Speech, and Signal Processing, Vol. ASSP-34, No. 5, October 1986, pp. 1081–1089, which is hereby incorporated by reference). For a more general non-white noise case, with the noise having a Hermitian covariance ($R_{nn}$), equation (12) is modified as follows:

$$\Pi^\perp_{A,Rnn} = R_{nn}^{1/2} B (B^H R_{nn} B)^{-1} B^H R_{nn}^{H/2} \tag{13}$$

Where $R_{nn}^{1/2}$ and $R_{nn}^{H/2}$ represent the square root factors of $R_{nn}$, which can be determined by methods including, but not limited to the Cholesky decomposition. This projection is further modified to incorporate the array distortion coefficients Γ($\phi_i$), given that the signal modifier 74 uses a direct matrix inversion as expressed in equation (11), and the projection can be expressed as follows:

$$\Pi^\perp_{A,Rnn,\Gamma} = R_{nn}^{1/2} \Gamma(\phi_i)^{-1} B (B^H \Gamma(\phi_i)^{-H} R_{nn} \Gamma(\phi_i)^{-1} B)^{-1} B^H \Gamma(\phi_i)^{-H} R_{nn}^{H/2} \tag{14}$$

The IQML iterations or WSF computations are subsequently performed using the projection expressed in equation (14) rather than the ideal model expressed in equation (12) to yield the DOA estimate 46.

As can be appreciated, the methods presented in this preferred exemplary embodiment of the present invention delivers DOA estimates with superior accuracy to methods that are either unaware of array distortions or unable to compensate for array distortions. Utilization of the signal modifier 74 to reduce the contribution of array distortions to the received RF signal mitigates the effect that the array distortions have on the DOA estimate 46. However, some array distortions perform poorly with only this signal modification, so the use of a DOA estimation algorithm modified to compensate for the effect of the array distortions and the signal modifications of the signal modifier 74 are preferable to deliver estimates of the DOA. The increased accuracy in the DOA estimate can be attributed to the improved mathematical model for the received RF signals 68. This improved mathematical model is made possible by knowledge of array distortion coefficients 78, which are locally applied within the approximate region of the preliminary DOA estimates (θ') 78. The present invention accomplishes this correction with relatively low complexity as compared to exhaustive search methods. Furthermore, a reduced set of the array distortion calibration measurements 124 is stored within the array distortion database 80. Therefore, the present invention provides desirable results of improved accuracy without computationally expensive and storage intensive exhaustive searches.

While the invention has been particularly shown and described with reference to a particular embodiment, it will be understood by those skilled in the art that various changes in form and details may be made therein without departing from the spirit and scope of the invention, and it is intended that all such changes come within the scope of the following claims.

What is claimed is:

1. A method for determining a direction of arrival (DOA) of a Radio Frequency (RF) signal transmitted by a remote unit in a wireless communication system, comprising:

receiving said RF signal with a plurality of antennas of an antenna array;

determining a preliminary DOA for said RF signal received with said plurality of antennas of said antenna array;

selecting a coefficient for said plurality of antennas of said antenna array based at least in part upon said preliminary DOA;

modifying said RF signal with said coefficient for said plurality of antennas of said antenna array to generate a modified RF signal; and determining said DOA of said RF signal transmitted by said remote unit in said wireless communication system with said modified RF signal.

2. The method of claim 1, wherein said coefficient is an array distortion coefficient.

3. The method of claim 1, wherein determining said DOA of said RF signal transmitted by said remote unit in said wireless communication system with said modified RF signal incorporates corrections for mutual coupling distortion of said plurality of antennas of said antenna array.

4. The method of claim 2, wherein selecting said array distortion coefficient for said plurality of antennas of said antenna array based at least in part upon said preliminary DOA utilizes a relationship between a composite array manifold, an ideal array manifold and a pre-multiplying linear distortion term.

5. The method of claim 4, wherein said pre-multiplying linear distortion term incorporates a collective effect of array distortion for said plurality of antennas of said antenna array.

6. The method of claim 1, wherein selecting a coefficient for said plurality of antennas of said antenna array based at least in part upon said preliminary DOA further comprises generating a coefficient database.

7. The method of claim 6, wherein selecting a coefficient for said plurality of antennas of said antenna array based at least in part upon said preliminary DOA comprises:

identifying a target DOA for said preliminary DOA; and selecting said coefficient from said coefficient database that corresponds to said target DOA.

8. The method of claim 6, wherein generating said coefficient database comprises:

selecting a first DOA range;

identifying a plurality of calibration measurements within said first DOA range;

conducting a linear averaging operation of said plurality of calibration measurements to yield said coefficient;

associating a target DOA with said coefficient; and storing said target DOA associated with said coefficient in said coefficient database.

9. The method of claim 1, wherein modifying said RF signal with said coefficient for said plurality of antennas of said antenna array to generate said modified RF signal employs a direct matrix inversion.

10. The method of claim 1, wherein modifying said RF signal with said coefficient for said plurality of antennas of said antenna array to generate said modified RF signal employs a least squares operation.

11. The method of claim 1, wherein modifying said RF signal with said coefficient for said plurality of antennas of said antenna array to generate said modified RF signal employs a maximum likelihood operation.

12. The method of claim 1, wherein determining said DOA of said RF signal transmitted by said remote unit in said wireless communication system with said modified RF signal comprises performing an additional DOA operation that utilize said coefficient in determining said DOA of said RF signal transmitted by said remote unit in said wireless communication system with said modified RF signal.

13. The method of claim 12, wherein said additional DOA operation comprises a modified Iterative Quadratic Maximum Likelihood (IQML) method.

14. An apparatus for determining a direction of arrival (DOA) of a Radio Frequency (RF) signal transmitted by a remote unit in a wireless communication system, comprising:

a plurality of antennas of an antenna array configured to receive said RF signal;

a first DOA determinator configured to determine a preliminary DOA for said RF signal received with said plurality of antennas of said antenna array;

a coefficient selector configured to select a coefficient for said plurality of antennas of said antenna array based at least in part upon said preliminary DOA;

a signal modifier configured to modify said RF signal with said coefficient for said plurality of antennas of said antenna array to generate a modified RF signal; and a second DOA determinator configured to determine said DOA of said RF signal transmitted by said remote unit in said wireless communication system with said modified RF signal.

15. The apparatus of claim 14, wherein said coefficient is an array distortion coefficient.

16. The apparatus of claim 14, wherein said second DOA determinator is configured to incorporate a correction for mutual coupling distortion of said plurality of antennas of said antenna array.

17. The apparatus of claim 15, wherein said coefficient selector is configured to utilize a relationship between a composite array manifold, an ideal array manifold and a pre-multiplying linear distortion term.

18. The apparatus of claim 17, wherein said pre-multiplying linear distortion term incorporates a collective effect of array distortion for said plurality of antennas of said antenna array.

19. The apparatus of claim 14, wherein said coefficient selector comprises a coefficient processor configured to identify a target DOA for said preliminary DOA and select said coefficient from a coefficient database that corresponds to said target DOA.

20. The apparatus of claim 19, further comprising a database generator configured to generate said coefficient database.

21. The apparatus of claim 20, wherein said database generator comprises:
   a calibration measurement database having a plurality of calibration measurements; and
   a database processor configured to select a first DOA range and a group of said plurality of calibration measurements within said first DOA range, said database processor further configured to conduct a linear averaging operation of said group of said plurality of calibration measurements to yield said coefficient and associate a target DOA with said coefficient.

22. The apparatus of claim 14, wherein said signal modifier employs a direct matrix inversion.

23. The apparatus of claim 14, wherein said signal modifier employs a least squares operation.

24. The apparatus of claim 14, wherein said signal modifier employs a maximum likelihood operation.

25. The apparatus of claim 14, wherein said second DOA determinator is configured to perform an additional DOA operation utilizing said coefficient in determining said DOA of said RF signal transmitted by said remote unit in said wireless communication system with said modified RF signal.

26. The apparatus of claim 25, wherein said additional DOA operation is a modified Iterative Quadratic Maximum Likelihood (IQML) method.

* * * * *